United States Patent Office.

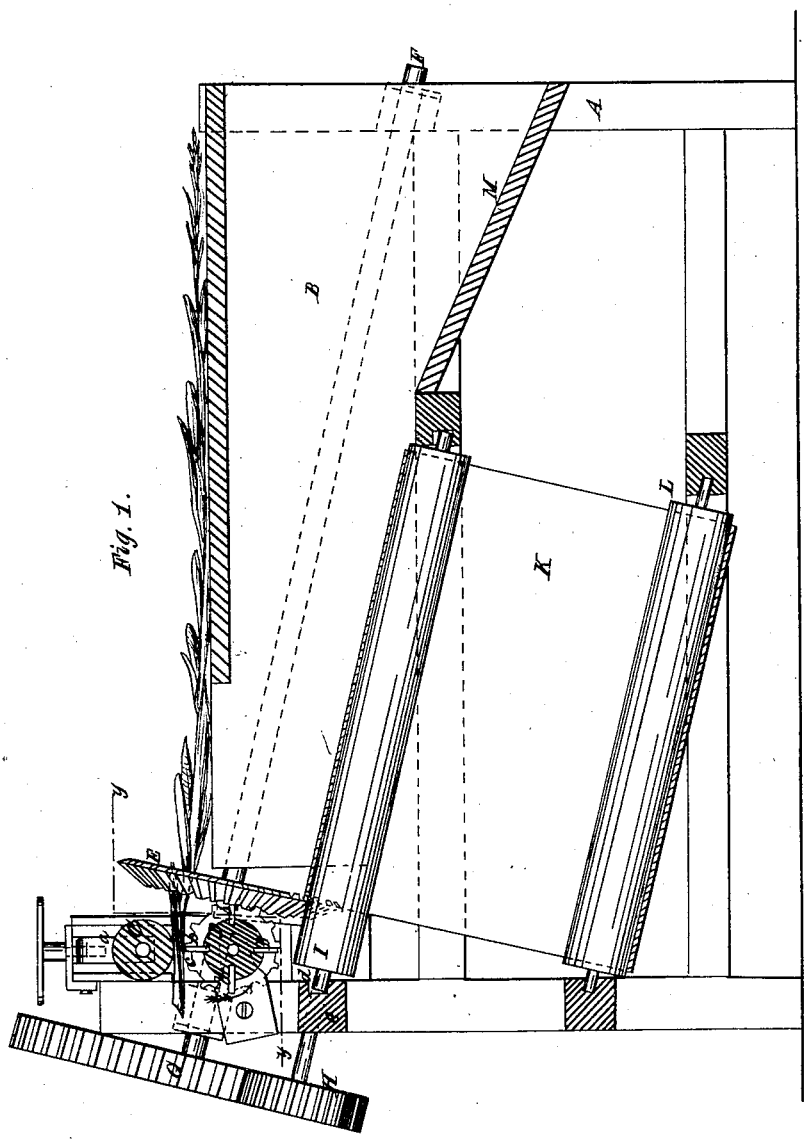

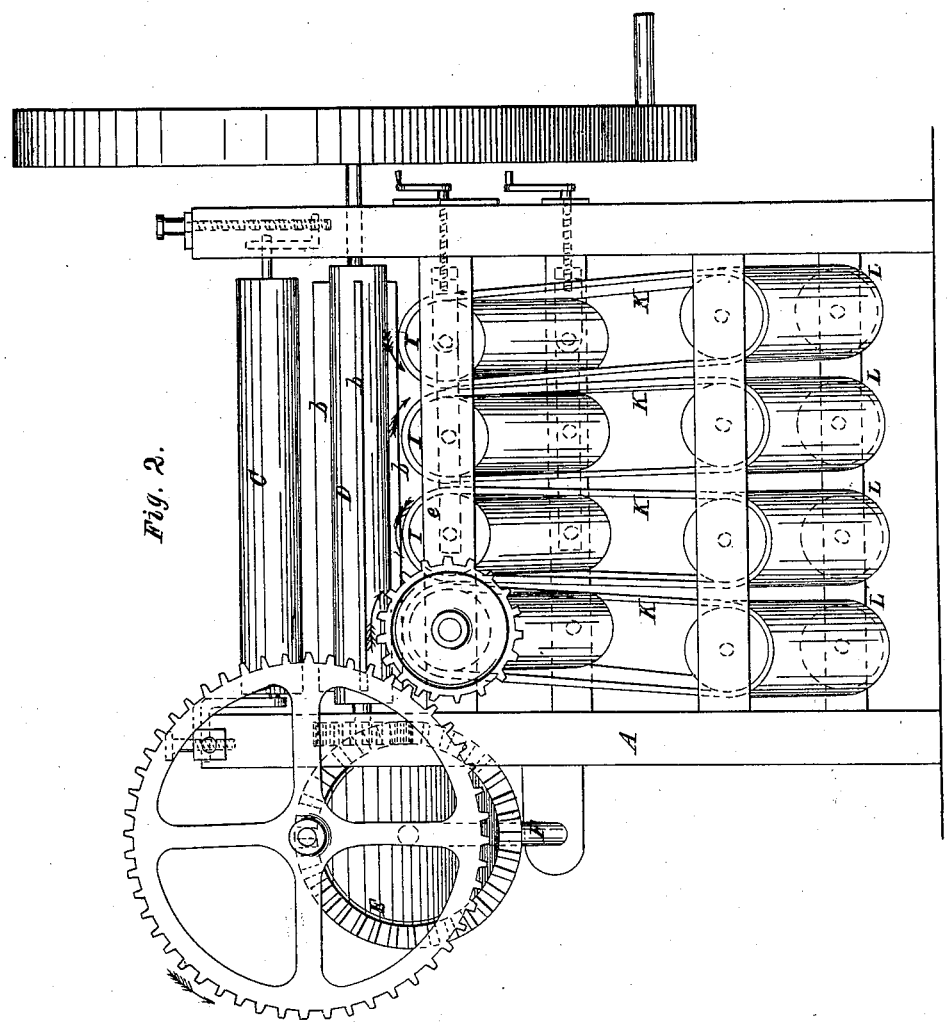

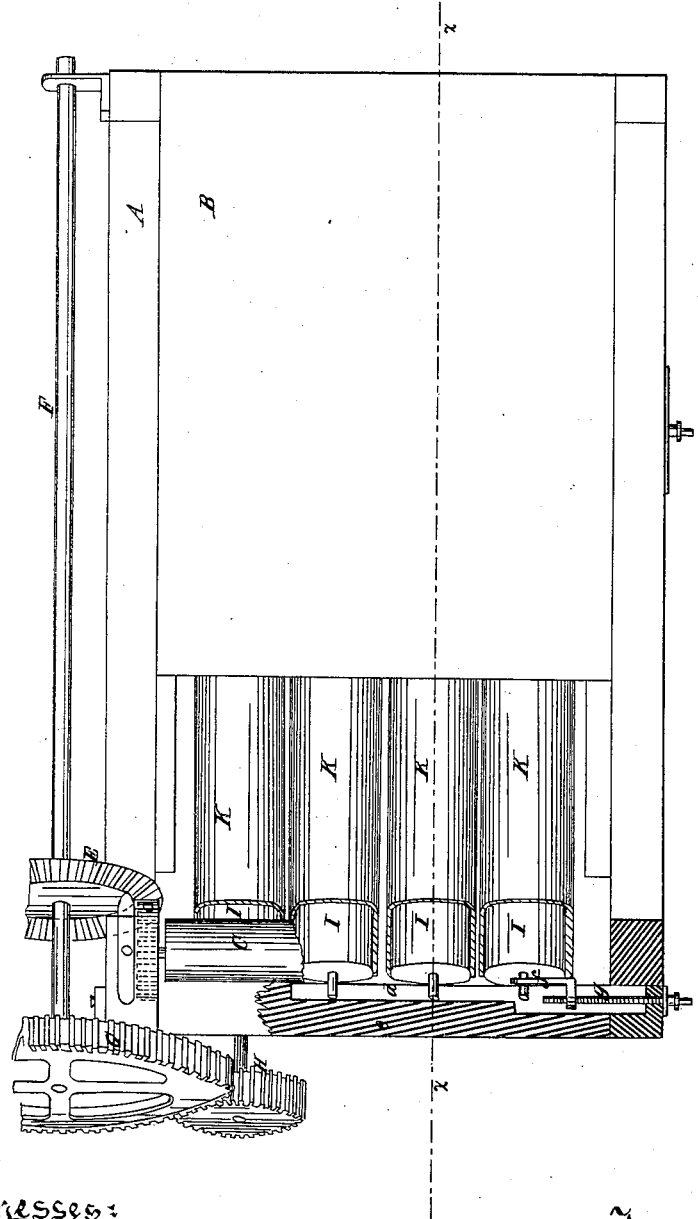

H. W. KNOWLTON, OF SARATOGA SPRINGS, NEW YORK.

Letters Patent No. 73,251, dated January 14, 1868; antedated January 1, 1868.

---

IMPROVEMENT IN MACHINE FOR HUSKING CORN.

---

The Schedule referred to in these Letters Patent and making part of the same.

---

TO ALL WHOM IT MAY CONCERN:

Be it known that I, H. W. KNOWLTON, of Saratoga Springs, in the county of Saratoga, and State of New York, have invented a new and improved Corn-Husking Machine; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, fig. 3.

Figure 2, an end view of the same.

Figure 3, a plan or top view of the same, partly in section, as indicated by the line $y\ y$, fig. 1.

Similar letters of reference indicate corresponding parts.

This invention relates to a new and improved machine for stripping Indian corn from the stalks, and taking the husks from the ears.

The invention consists of a pair of stripping-rollers, one of which is armed with stripping-blades, in connection with a series of husking-aprons, arranged to work over rollers, as hereinafter fully shown and described, whereby the ears of corn may be broken or detached from the stalks, and the husks removed from the detached ears with the greatest facility.

A represents a framing constructed in any proper manner to support the working parts, and B is a box, which encloses a portion of the working parts. In the front part of the framing A there are two horizontal rollers, C D, placed one over the other in the same axial plane. The upper roller, C, has its axis in yielding bearings $a$, but the lower roller, D, has its axis in fixed bearings, and is armed with longitudinal blades, $b$, extending its whole length. Four of these blades are shown attached to roller D, in fig. 1, but more or less may be used; four will probably be the preferable number. The power is applied to the axis of the lower roller, D, and one end of said axis has a bevel-pinion, $c$, upon it, which gears into a bevel-wheel, E, on a shaft, F, at one side of the framing A, said shaft F having a toothed wheel, G, on its front end, to gear into a pinion, H, on the front end of the axis of a roller, I, placed longitudinally in the framing A, and having an inclined position, its front end being more elevated than its rear end. There are four or more of these rollers, I, placed side by side, and having India-rubber aprons, K, passing over them, said aprons passing around corresponding rollers, L, in the lower part of the framing. The rollers L have their axes fitted in fixed bearings; but the upper rollers, I, have their axes or journals in an oblong or longitudinal groove, $d$, in a front cross-bar, $e$, of the framing, and the front journal of one of the side rollers, I, has a plate, $f$, upon it, through which a screw, $g$, passes, and by turning which the aprons K may be pressed snugly in contact, so that they will operate efficiently in detaching the husks from the ears.

The stalks of corn, with the ears upon them, are placed on the top of the box B, and power applied to the lower roller, D, the rollers C D moving in the direction indicated by the arrows. The stalks are passed between the rollers C, D, the blades $b$ breaking the ears from the stalks, the stalks passing between the rollers, while the ears drop down upon the aprons K, over the rollers I, the aprons drawing the husks from the ears, which are discharged from the inclined plane M at the rear of the rollers I, while the husks are discharged down between the aprons K. The aprons K effectually prevent the machine becoming choked or clogged up by the husks, a contingency of frequent occurrence where the ordinary rollers are used for the purpose, the husks being liable to wind around the rollers, which is effectually prevented by the aprons.

Having thus described my invention, what I claim as new, and desire to secure by Letters Patent, is—

The combination of the rollers C D with the elastic aprons K, on the rollers I L, substantially as and for the purpose set forth.

H. W. KNOWLTON.

Witnesses:
S. V. ROBBINS,
D. McMASTER.